(12) United States Patent
Vishwanath et al.

(10) Patent No.: US 7,779,139 B2
(45) Date of Patent: Aug. 17, 2010

(54) NORMALIZATION OF BINARY DATA

(75) Inventors: Tirunelveli R. Vishwanath, Redmond, WA (US); Stephen Jared Maine, Seattle, WA (US); Erik B. Christensen, Seattle, WA (US); Michael J. Coulson, Clyde Hill, WA (US)

(73) Assignee: Microsoft Corporation, Redmond, WA (US)

( * ) Notice: Subject to any disclaimer, the term of this patent is extended or adjusted under 35 U.S.C. 154(b) by 185 days.

(21) Appl. No.: 12/037,842

(22) Filed: Feb. 26, 2008

(65) Prior Publication Data

US 2008/0270624 A1 Oct. 30, 2008

Related U.S. Application Data

(60) Provisional application No. 60/915,080, filed on Apr. 30, 2007.

(51) Int. Cl.
G06F 15/16 (2006.01)
G06F 15/173 (2006.01)

(52) U.S. Cl. ............... 709/231; 709/204; 709/238; 709/246

(58) Field of Classification Search ........... 709/204, 709/231, 238
See application file for complete search history.

(56) References Cited

U.S. PATENT DOCUMENTS

| 6,571,248 | B1 | 5/2003 | Kusama |
| 6,810,429 | B1 | 10/2004 | Walsh et al. |
| 7,089,567 | B2 | 8/2006 | Girardot et al. |
| 7,158,990 | B1 | 1/2007 | Guo et al. |
| 7,350,199 | B2 * | 3/2008 | Ito et al. ............... 717/141 |
| 2003/0069930 | A1 * | 4/2003 | Van Willigen ........... 709/204 |
| 2004/0098667 | A1 | 5/2004 | Atkinson |
| 2005/0086594 | A1 | 4/2005 | Schlimmer et al. |
| 2005/0114762 | A1 | 5/2005 | Binding et al. |
| 2005/0210387 | A1 * | 9/2005 | Alagappan et al. ........ 715/700 |
| 2005/0273705 | A1 * | 12/2005 | McCain ............... 715/513 |
| 2006/0168513 | A1 | 7/2006 | Coulson et al. |
| 2006/0215701 | A1 | 9/2006 | Fenelon |
| 2007/0156919 | A1 * | 7/2007 | Potti et al. ............. 709/238 |
| 2007/0180132 | A1 * | 8/2007 | Purdy et al. ............. 709/230 |

OTHER PUBLICATIONS

XML, SOAP and Binary Data (10 pages) http://www.xml.com/pub/a/2003/02/26/binaryxml.html, Published Feb. 26, 2003.
An Introduction to the Web Services Architecture and Its Specifications (31 pages) http://msdn2.microsoft.com/en-us/library/ms996441.aspx, Published Oct. 2004.
The XML Files (6 pages) http://msdn.microsoft.com/msdnmag/issues/01/05/xml/, Published May 2001.

* cited by examiner

*Primary Examiner*—Saleh Najjar
*Assistant Examiner*—Vitali Korobov
(74) *Attorney, Agent, or Firm*—Workman Nydegger

(57) ABSTRACT

The transformation of data between binary data and hierarchical data, such as might be processed by an Infoset Processor. When data is received from a network in binary format, the transformation module transforms the binary data into a hierarchical data representation of the binary data, and then provides the transformed data to message processors (e.g., Infoset processors) that understand the hierarchical schema. The transformation module may also transform hierarchical data into binary data for transmission on a network.

13 Claims, 3 Drawing Sheets

NORMALIZATION OF BINARY DATA

CROSS-REFERENCE TO RELATED APPLICATIONS

This patent application claims priority to U.S. provisional application Ser. No. 60/915,080 filed Apr. 30, 2007, which provisional application is incorporated herein by reference in its entirety.

BACKGROUND

Networks involve communication between various nodes in the network. Each node may have a message processor associated with it. Each message processor may be designed to handle data of a particular format. For instance, Infoset processors are designed to process data that is represented in eXtensible Markup Language (XML) format. Binary processors, on the other hand, are not capable of processing Infoset data, but instead, process binary data, even though binary processors and Infoset processors exist at equivalent levels in the protocol stack.

There are presently a large number of Infoset processors, each able to communicate with each other. There are also a large number of binary processors, each able to communicate with each other. However, binary processors typically cannot communicate well, if at all, with Infoset processors.

BRIEF SUMMARY

Embodiments described herein relate to a mechanism for transforming data between binary data and hierarchical data, such as Infoset data. If binary data is received on a network, the mechanism transforms the data into a hierarchical representation. If hierarchical data is received from a message process that understands the hierarchical schema, that data is transformed into a binary representation. This permits message processors at the same level of the protocol stack to communicate one with another, even if one is a binary processor and the other is a hierarchical data processor. Accordingly, a bridge of communication and collaboration between heterogenic message processors may be formed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
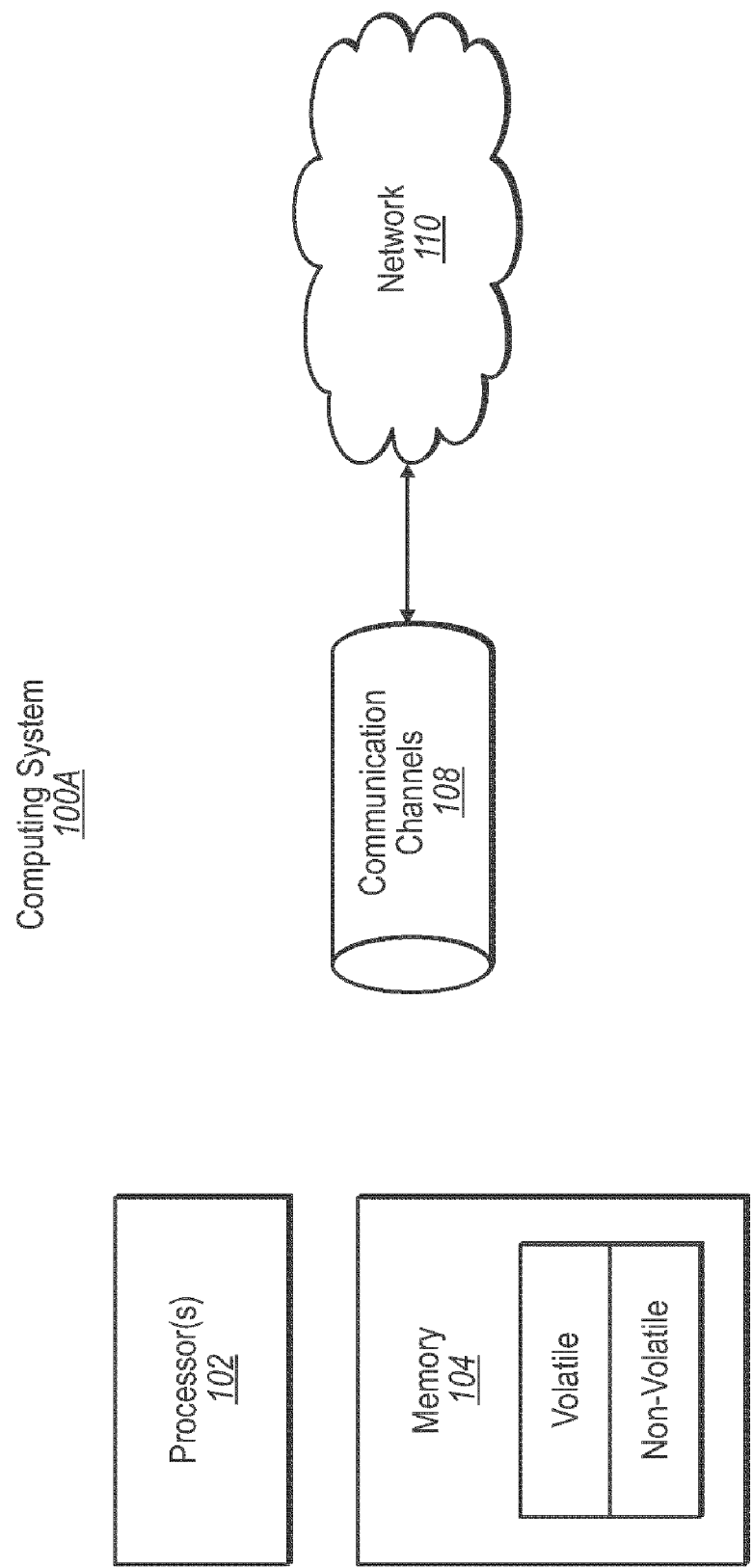
FIG. 1A illustrates a message processor in the form of a computing system.

In accordance with embodiments described herein, a messaging system processes hierarchical data payloads so as to also process binary data. In this description and in the claims, "hierarchical data" is a set of name-value pairs where each pair represents a node in a hierarchical structure, and in which each node, except the root node, has a parent node, and zero or more child nodes. In one embodiment, the hierarchical data is structured to follow a particular schema. Such hierarchical data structures are sometimes useful to organize data in a logical structured manner.

One example of a hierarchical data structure is eXtensible Markup Language (XML) data. In the remainder of this description, embodiments will be described with respect to XML data, although one of ordinary skill in the art will appreciate after having reviewed this description, that the embodiments described herein may also be applied to any hierarchically structured data. When implemented in XML, the embodiments described herein provide a mechanism for transparently normalizing data that is not XML into an XML-based processing model. "Binary" data is defined as data that does not follow a hierarchically structured schema such as XML.

As a concrete example, consider the problem of returning a plain JPEG image from an XML processing system. The JPEG image cannot be handled internally by the XML processing system in its native form, as JPEG images are a binary format that does not conform to the XML data model. There are ways of tunneling binary data through XML, but clients expecting to receive a pure JPEG image back from the server may not know about XML. Accordingly, the client might expect to get a real JPEG image. Thus client might not be written to "unwrap" the server's XML representation in order to get at the real image. As a result, there is a divide between XML message processing systems and binary message processing systems. Embodiments described herein bridge that divide in a way that is transparent to both client and server. Neither the client nor the upper layer coding in the server side would require special casing. The server can process the JPEG as if it were a JPEG. The client can process the JPEG as a JPEG. Intermediate XML-only processors between the server and the client can process the data as if it were XML, unaware that it is actually processing data representing a JPEG.

In this description, the terms "server" and "client" are used. This naming convention is merely used to distinguish one computing system from another. The server (i.e., a server computing system) may be any computing system, even one that is not conventionally thought of as a "server". Similarly, the client (i.e., the client computing system) may also be any computing system. The client and server may even be implemented on the same computing system. As used herein, the term "server" is applied to the computing system that handles binary data, whereas the term "client" is applied to the computing system that handles hierarchical (or XML) data. In this description, a computing system should be interpreted broadly to include any system (whether distributed or undistributed) that includes at least one processor and a memory.

Figure 1B:
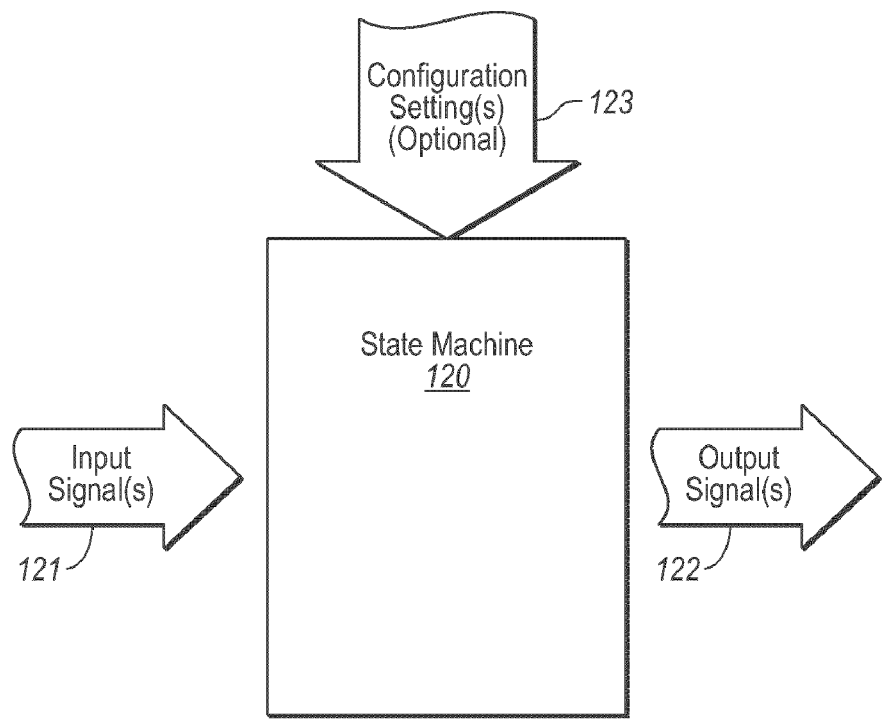
FIG. 1B illustrates a message processor in the form of a state machine.
Figure 2:
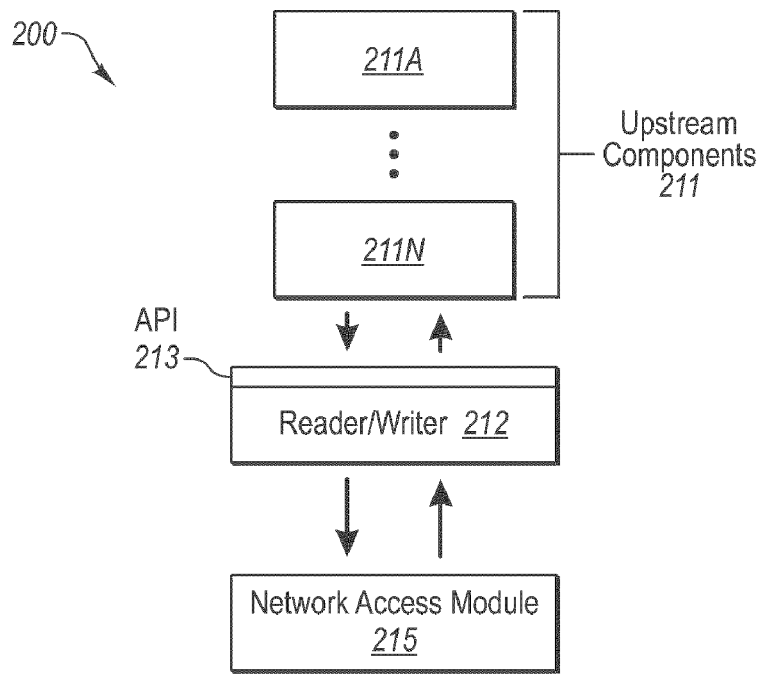
FIG. 2 illustrates a message processing architecture in which a unique reader/writer component is interpositioned between upstream hierarchical processing components and a network access module.
Figure 3:
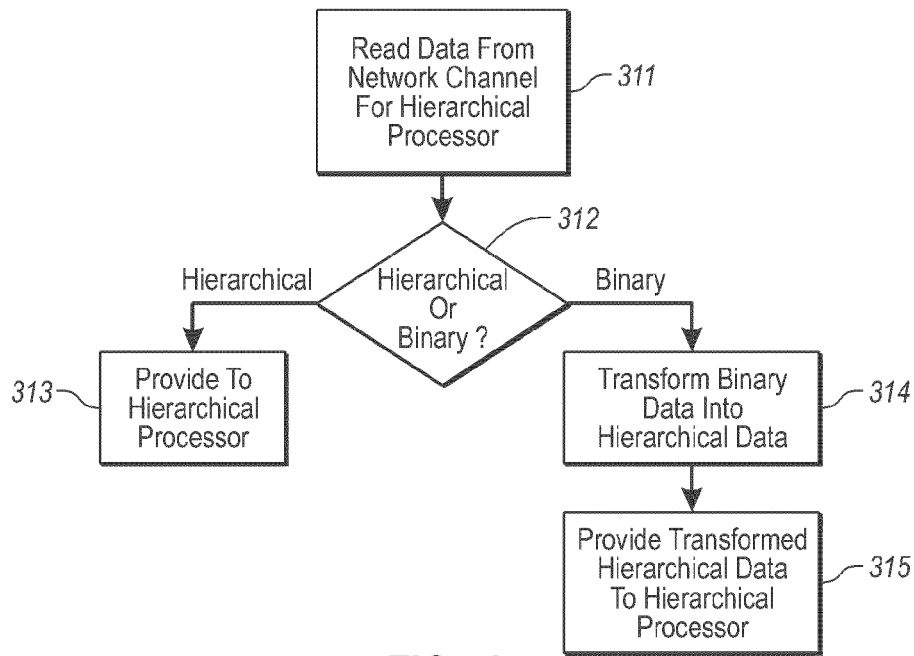
FIG. 3 illustrates a flowchart of a method for simulating receipt of hierarchical data structures.
Figure 4:
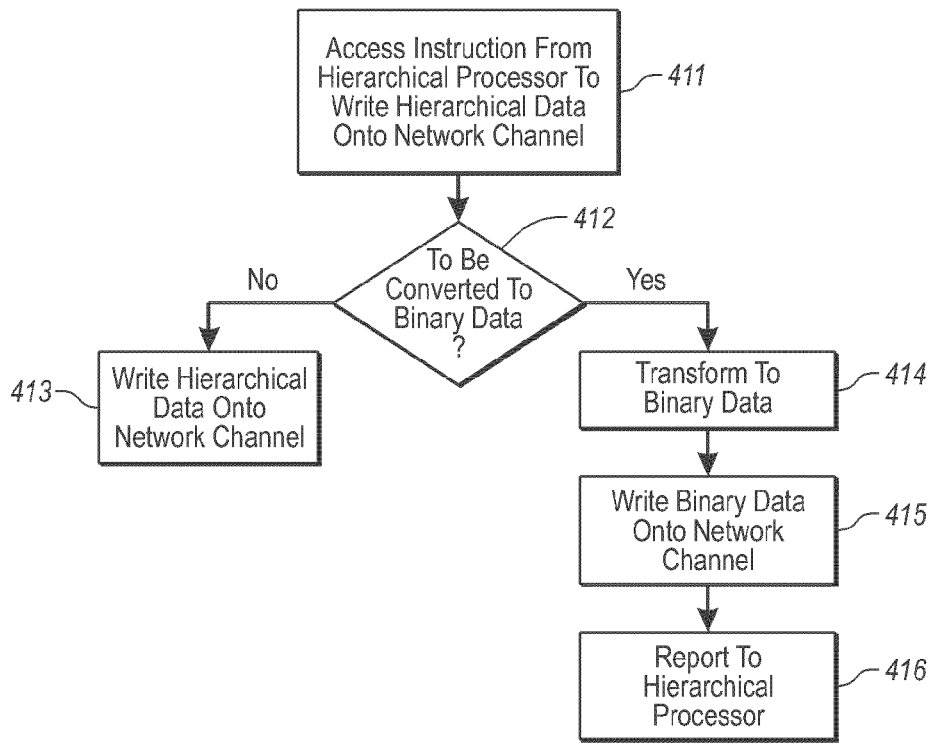
FIG. 4 illustrates a flowchart of a method for simulating dispatch of hierarchical data structures.

After describing a general message processor in which the embodiments described herein may be employed with respect to FIGS. 1A and 1B, various as embodiments of the message processing system will then be explained with respect to FIGS. 2 through 4.

A message processor may be implemented in software or hardware, or a combination thereof. FIG. 1A illustrates a computing system, which may implement a message processor in software. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems. That said, a "message processor" is not even limited to use in a computing system at all.

FIG. 1A illustrates a message processor in the form of a computing system 100A. In its most basic configuration, a computing system 100A typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

As used herein, the term "module" or "component" can refer to software objects or routines that execute on the computing system. The different components, modules, engines, and services described herein may be implemented as objects or processes that execute on the computing system (e.g., as separate threads). However, as will be described further below with respect to FIG. 1B, the message processor may be implemented as a state machine as well, perhaps even fully in hardware.

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100A.

Computing system 100A may also contain communication channels 108 that allow the computing system 100A to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FIG. 1B illustrates a message processor in the form of a state machine 120. A state machine 120 may be implemented entirely in hardware, although that need not be the case. The state machine 120 receives input signal(s) 121, and deterministically generates output signal(s) 122. Optionally, the deterministic function may depend on one or more optional configuration settings 123. In one embodiment, the state machine 120 may be implemented using logic gates and potentially other circuit components such as perhaps registers and clocks. When implemented as a message processor, the state machine 120 may perform the message dispatch described herein.

FIG. 2 illustrates several components of a messaging system 200. The messaging system may be contained by any message processor including those described with respect to FIGS. 1A and 1B. That said, the environment of the messaging system 200 is not limited to FIGS. 1A and 1B.

In particular, the system 200 includes upstream processing components 211, a network access module 215, and a reader/writer module 212 interpositioned between the hierarchical processing component 211 and the network access module.

The upstream processing components 211 includes one or more hierarchical processing component 211A through 211N. Some of the lower level processing components (and perhaps all of the processing components 211) are configured to handle data in the form of hierarchical data structures. For example, eXtensible Markup Language (XML) is a hierarchical data format that allows for a hierarchical structure of element, where each element includes name-value pairs.

The network access module 215 provides a network channel to the reader/writer module 212. The network access module 215 provides a stream of data to the reader/write module 212 from a network channel, and can receive data streams from the reader/writer module 212 for transmission onto the network channel. The reader/writer module 212 provides an Application Program Interface (API) 213 whereby the upstream components 211 can read hierarchical data structures from the as reader/writer module 212, and write hierarchical data to the reader/writer module 212. The hierarchical processing components 211 may be, for example, Infoset processors.

The reader/writer module 212 has functionality that allows hierarchical processing components (such as Infoset processors), to communicate with other processors that do not process such hierarchical data. For instance, an Infoset processor may read Infoset data from the reader/writer module 212, and write Infoset data to the reader/writer module 212. Furthermore, the reader/writer module 212 is configured to transform "binary data" (e.g., image, sound, or executables) received from the network via the network access module into Infoset data, and provide the Infoset data to the Infoset processor. A method for doing this is illustrated and described with respect to FIG. 3. The reader/writer module 212 is further configured to receive Infoset data from the Infoset processor, transform the Infoset data into binary data, and provide the transformed binary data to the network access module. The reader/writer module 212 can do this in a way that the Infoset processors do not have to take special action depending on whether they are communicating with another Infoset processor or not. In one embodiment, the upstream components 211 do not change the way that they interface with the reader/writer module 212 through API 213 regardless of whether or not the transformation to or from binary data actually occurred. Thus, the transformation may be completely transparent to the upstream components 211.

FIG. 3 illustrates a flowchart of a method 300 for simulating that hierarchical data was read from a data stream when in reality binary non-hierarchical data was read from the data stream. The method 300 may be performed by the reader/writer module 212 of FIG. 2 acting in its capacity as a reader.

The reader module 212 first determines that data is to be provided from a as network channel to an upstream hierarchical processing component (e.g. an Infoset processor). This may occur when the reader module 212 receives an instruction from the upstream components 211 to read the next piece of data from the data stream. For example, if the reader module 212 were an XML reader, the XML reader might receive a "ReadStartElement" function call from the upstream components 211 via the API 213. This ReadStartElement function call is a function call that the upstream elements may normally make to an XML reader as the XML reader is accessing the next XML token.

The action taken by the XML reader may then differ depending on whether the data read from the network channel is in binary format or hierarchical format structured in accordance with a hierarchical data structure (decision block 312). If the data is hierarchical format (e.g. represents XML data) ("Hierarchical" in decision block 312), the XML reader 212 may provide the next XML token to the upstream component just as a normal XML reader might do (act 313).

However, if the data read from the network channel is non-hierarchical data ("Binary" in decision block 312), the reader 312 actually automatically transforms the binary data into an equivalent hierarchical data structure. For instance, referring to FIG. 2, the reader 212 might receive raw binary data in the form of, for example, an image (e.g., a JPEG file), a sound file, a video file, an executable file, or some other sequence of bits that are not structured in accordance with the hierarchical format that the hierarchical message processors 211 are expecting to receive. In one embodiment, the reader might automatically transform that data into the following equivalent hierarchical data structure:

```
<Binary>
    [base64 encoded representation of said binary data]
<Binary>
```

That is, an opaque binary data blob is defined to be logically equivalent to an XML Infoset consisting of a single Element Information Item named "Binary" whose sole child is a Text Information Item containing the base64-encoded string representation of said data. In this description, a binary data "blob" is used to describe a sequence of arbitrary bits representing binary data.

This logical infoset may be created dynamically by wrapping a special XmlReader on top of the underlying data stream. This reader conforms to the implementation contract of a standard XmlReader but implements a special state machine. The first time ReadStartElement is called, the binary reader acts as if an Element Information Item named <Binary> was read from the underlying stream. Of course, the Element Information Item was not read from the underlying data stream since that stream is not XML.

In this very specific example, the upstream components may then call ReadBase64( ) in a loop to read the underlying bytes of the stream, which are read directly from the underlying data stream. When the stream is completely read (indicated to the caller of ReadBase64( ) via a special return value), the caller can call ReadEndElement at which time the special XmlReader will behave as if a terminating element name </Binary> had appeared from the underlying data stream. Once again, this terminating element name </Binary> was not actually read from the underlying data stream, but the XmlReader behaves as though it had. At this point, the silent transformation from binary data into the XML Infoset is complete and higher layers of the server stack can process the Infoset in the standard way.

It should be noted that the implementation contract of an XmlReader API's may have the implementor of ReadBase64( ) to decode the "encoded" string prior to surfacing the data to the caller. This implies that if the data was not actually base64-encoded no work needs to be done. In this way, needless encoding and decoding of the data stream may be avoided which leads to increased performance.

Referring back to FIG. 3, once the automated transformation of the binary data into an equivalent hierarchical data structure is completed, the hierarchical data structure is provided to the upstream hierarchical processing components 311 (act 315). As previously mentioned, this transformed data may be provided in the same manner as the data would be output had it originally been received from the network channel not as the binary data, but as the equivalent hierarchical data structure in the first place.

FIG. 4 illustrates a flowchart of a method 400 for providing hierarchical data in binary format in a manner that is transparent to the hierarchical processing component. The method 400 is initiated upon receipt of a request from a hierarchical processing component (e.g., Infoset processor) to write a hierarchical data structure structured in a hierarchical data format to the network channel (act 411). Once again, the hierarchical message processors may be Infoset processors, and may request to write XML to the underlying network channel. The network channel may have its own lower level functionality that actually further processes the data and physical provides the data onto the network (e.g., XML or Infoset data, perhaps base 64 encoded and using a Binary tag—may be encoded image, sound, executable or the like) onto a network channel (act 411). In this capacity, the reader/writer module 212 of FIG. 2 acts as a writer. If writing XML, the writer 212 may be an XmlWriter module.

The XML writer 212 then determines whether the hierarchical data is to be converted into an equivalent binary format prior to writing the data onto the network channel (decision block 412). If the data is not to be converted into binary data (No in decision block 412), the data is provided in its hierarchical format onto the network channel (act 413). In this case, the XML writer 212 behaves much like a conventional XML writer might.

However, if the XML writer determines that the hierarchical data structure is to be converted into binary data (Yes in decision block 412), the XML writer automatically transforming the hierarchical data structure into equivalent binary data even though not requested by the hierarchical processing component (act 414). The XML writer then writes the equivalent binary data onto the network channel (act 415). The writer reports back to the Infoset processor (act 416) that that XML data has been written.

For instance, suppose the XML writer received a request to write the following XML element onto the network channel:

```
<Binary>
    [base64 encoded representation of said binary data]
<Binary>
```

The writer would actually remove the start and end tags, decode the base 64 encoded string, and write the raw binary data onto the network channel. To the upstream hierarchical processing components, the writer acted as though it simply wrote the XML data onto the network channel as requested. Accordingly, the transformation was transparent to the upstream Infoset processors. For all these processors know, they were communicating with other Infoset processors. This allows the gap between the non-Infoset world and the Infoset world to be bridged, thereby allowing for greater communication and collaboration across heterogenic networks.

In one specific example, suppose again that the XML writer was requested to write the following onto the network channel:

```
<Binary>
    [base64 encoded representation of said binary data]
<Binary>
```

When the caller calls WriteStartElement( ), the XmlWriter appears to the caller as if it had actually written the element but does not actually write data to the output stream at this time. The caller then loops over the byte stream, calling WriteBase64( ) on the XmlWriter. The implementation contract of WriteBase64 may requires the callee to apply the Base64 encoding. In one embodiment, this may simply writes the bytes it receives from the caller directly to the output stream. When the caller is finished writing the byte stream, it calls WriteEndElement( ) on the XmlWriter which again appears to the caller as if the terminating element has been written but does not actually write this data to the stream. This completes the transformation from XML Infoset into binary data, and the resulting byte stream produced by the writer can be consumed by clients that expect raw binary data.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable media having thereon computer-executable instructions that, when executed by one or more processors of a computing system, cause the computing system to simulate that hierarchical data was read from a data stream when in reality binary non-hierarchical data was read from the data stream, the method comprising the following:

an act of determining that data is to be provided from a network channel to an upstream hierarchical processing component that is an Infoset processor that processes data in a hierarchical data format;

an act of identifying that the data received from the network channel is binary data, not derived from, or including, hierarchically structured data in the hierarchical data format that is sometimes received over the network channel;

an act of automatically transforming the binary data into an equivalent hierarchical data structure that conforms to the hierarchical data format, the transformation occurring without an explicit request to make the transformation from the Infoset processor; and an act of outputting the equivalent hierarchical data structure to the Infoset processor in the same manner as the data would be output had it originally been received from the network channel not as the binary data, but as the equivalent hierarchical data structure.

2. The computer program product in accordance with claim 1, wherein the hierarchical data format is an eXtensible Markup Language (XML) format.

3. The computer program product in accordance with claim 1, wherein the equivalent hierarchical data structure is normalized Infoset data.

4. The computer program product in accordance with claim 3, wherein the act of outputting the equivalent hierarchical data structure comprises:

an act of making the normalized Infoset data available to the Infoset processor.

5. The computer program product in accordance with claim 3, wherein the normalized Infoset data comprises an XML tag encapsulating a base 64 encoded text representation of the binary data.

6. The computer program product in accordance with claim 5, wherein the XML tag is titled "Binary".

7. The computer program product in accordance with claim 1, wherein the binary data includes image data.

8. The computer program product in accordance with claim 1, wherein the binary data includes sound data.

9. The computer program product in accordance with claim 1, wherein the binary data includes executable data.

10. The computer program product in accordance with claim 1, wherein the data is first data, the hierarchical data structure is a first hierarchical data structure, and the computer-executable instructions are further structured such that, when executed by the one or more processors, the one or more processors are caused to perform the following:

an act of receiving a request from the hierarchical processing component to write second data structures in a second hierarchical data structure structured in the hierarchical data format onto the network channel;

an act determining that the second hierarchical data structure is to be converted into an equivalent binary data prior to being written onto the network channel rather than writing the second hierarchical data structure itself to the network channel as requested by the hierarchical processing component;

in response to the act of determining, an act of automatically transforming the second hierarchical data structure into equivalent binary data even though not requested by the hierarchical processing component; and an act of writing the equivalent binary data onto the network channel.

11. The computer program product in accordance with claim 1, wherein the one or more computer-readable media are volatile memory or non-volatile storage.

12. A system comprising:

an Infoset processor;

a network access module; and a reader/writer module providing an Application Program Interface whereby the Infoset processor may read Infoset data from the reader/writer module, and write Infoset data to the reader/writer module, wherein the reader/writer module is configured to, determine that data is to be provided from a network via the network access module to the Infoset processor component, wherein the Infoset processor component processes data in a hierarchical data format;

identify that the data received from via the network access module is binary data, not derived from, or including, hierarchically structured data in the hierarchical data format that is sometimes received from the network access module;

automatically transform the binary data into an equivalent hierarchical data structure that conforms to the hierarchical data format, the transformation occurring without an explicit request to make the transformation from the Infoset processor; and output the equivalent hierarchical data structure to the Infoset processor in the same manner as the data would be output had it originally been received from the network channel not as the binary data, but as the equivalent hierarchical data structure.

13. The system of claim 12, wherein the reader/writer is further configured to write the transformed binary data as Infoset data.

* * * * *

UNITED STATES PATENT AND TRADEMARK OFFICE
CERTIFICATE OF CORRECTION

| | | |
|---|---|---|
| PATENT NO. | : 7,779,139 B2 | Page 1 of 1 |
| APPLICATION NO. | : 12/037842 | |
| DATED | : August 17, 2010 | |
| INVENTOR(S) | : Tirunelveli R. Vishwanath et al. | |

It is certified that error appears in the above-identified patent and that said Letters Patent is hereby corrected as shown below:

In column 9, line 25, in Claim 12, delete "to," and insert -- to: --, therefor.

Signed and Sealed this
First Day of February, 2011

David J. Kappos
*Director of the United States Patent and Trademark Office*